C. C. SULLIVAN & L. P. DAVIS.
STUMP REMOVER AND DESTROYER.
APPLICATION FILED AUG. 31, 1914.
1,153,270.
Patented Sept. 14, 1915.
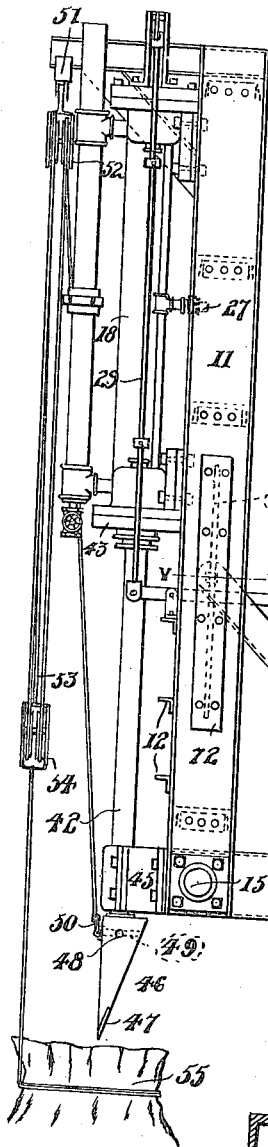
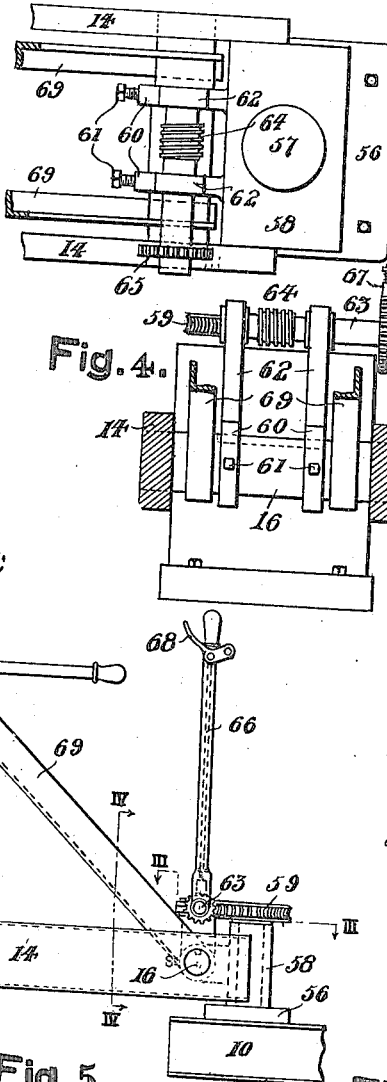
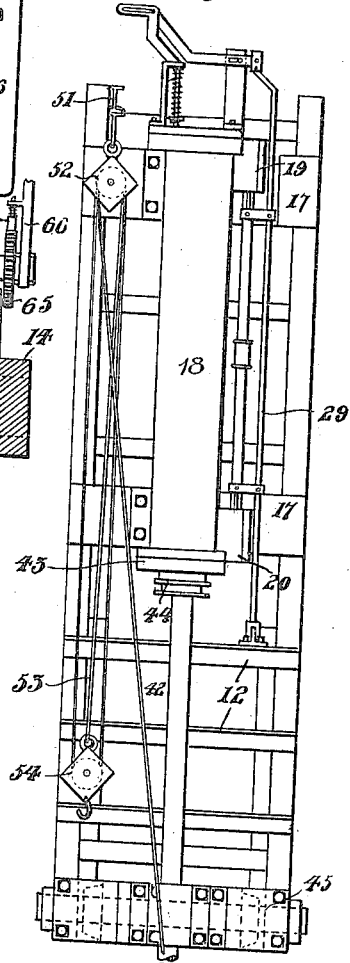
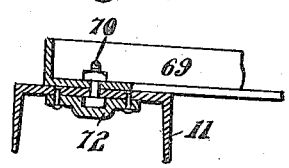
Witnesses
M. E. Lowry
J. Notes
Inventors
C. C. Sullivan
L. P. Davis
By A. M. Wilson
Attorney

UNITED STATES PATENT OFFICE.

CHARLES C. SULLIVAN AND LOUIS PENINGTON DAVIS, OF NEW ORLEANS, LOUISIANA.

STUMP REMOVER AND DESTROYER.

1,153,270.  Specification of Letters Patent.  Patented Sept. 14, 1915.

Application filed August 31, 1914.  Serial No. 859,447.

*To all whom it may concern:*

Be it known that we, CHARLES C. SULLIVAN and LOUIS PENINGTON DAVIS, citizens of the United States, and residing at New Orleans, in the parish of Orleans and State of Louisiana, have invented certain new and useful Improvements in Stump Removers and Destroyers, of which the following is a specification.

This invention relates to certain new and useful improvements in stump removers, and relates particularly to a machine for the removal and destruction of stumps, roots or other debris, particularly adapted for use on what are known as "cut off" lands, the invention having for its primary object the destruction of stumps, roots, etc., in such form that they may be readily handled and utilized for commercial purposes, or piled in such way as to be destroyed by burning.

Another object of the invention is to provide a machine or device of the character stated, so constructed that it may be manipulated so as to work upon the stump, root, or other object in a manner best calculated to effectually split the same so that it can be removed from the earth.

A still further object of our invention is to provide in a machine of this character, means whereby the same motive power as is used for the operation of the machine as a stump destroyer, may be employed for operating a block and tackle mechanism.

Various other objects are sought to be accomplished by our invention, which will appear hereinafter as the invention is more particularly described and then claimed, and in describing the invention in detail, reference will be had to the accompanying drawings showing a practical embodiment of the invention as it has been practised by us, without however, intending to limit ourselves to the precise construction herein shown, since in the practice of the invention, various changes and modifications may be made in the details without departing from the spirit of the invention as herein shown, described and claimed.

In the drawings: Figure 1 is a view in side elevation of a stump destroyer in accordance with our invention. Fig. 2 is a view of the same in front elevation. Fig. 3 is an enlarged horizontal sectional view taken on the line III—III of Fig. 1. Fig. 4 is a transverse vertical sectional view taken on the line IV—IV of Fig. 1 on a somewhat enlarged scale. Fig. 5 is a horizontal sectional view on a somewhat enlarged scale taken on the line V—V of Fig. 1, and, Fig. 6 is a detail perspective view of a portion of the ax member.

A machine in accordance with our invention in practice, is mounted upon a suitable truck that is moved by any desired motive power around over the land being operated upon. As such truck forms no part of the present invention, it is not illustrated in detail, the element 10 in Fig. 1 representing the truck diagrammatically.

The device embodies a frame consisting of a pair of vertical or upright side bars and a pair of horizontal side bars, the vertical or upright bars being designated as 11, and in practice, we have usually made the same of channel irons. These are secured to each other at desired points between their extremities by brace bars 12 usually of angle irons as shown.

The horizontal side bars or beams are designated by the reference numeral 14 and these beams are bored near their outer ends for the reception of a shaft 15 which also extends through the uprights 11, the latter being bored for the reception of said shaft near their lower ends, the shaft 15 having a loose fit in both the beams 14 and the uprights 11. The beams 14 are supported at their rear ends upon the extremities of a shaft 16, the support for which will be hereinafter referred to.

On the front of the uprights 11 are cross-braces 17 which form a support for a cylinder 18 that is suitably secured thereto and provided with valve chests 19, 20, at its upper and lower ends respectively. The inlet 27 for the steam, air or other motive fluid leads into the chests 19 and 20. The valves are controlled by a suitable valve rigging indicated in general at 29.

The cylinder has its piston rod 42 projecting through the lower cylinder head 43, the latter being usually constructed in practice with a stuffing box 44 as shown. The piston rod extends downwardly and is steadied by means of a casting 45 which is attached to the forward ends of the beams 14 and to the side faces of the uprights 11, this casting being provided with a suitable bearing for the piston rod so that the latter will be guided and steadied in its strokes.

Detachably secured to the lower end of the piston rod is the ax member 46, that is usually made in the form of a steel casting, which may be screwed or pinned on to the piston rod. This ax member is provided with a detachable cast steel cutting edge 47 which is countersunk in the ax member so that its outer face will be flush with the outer inclined face of the ax member, thereby protecting the cutting blade against breakage and interfering in no way with the cutting and splitting action of the ax member. The ax member is provided with holes 48, and 49, respectively, extending entirely therethrough from opposite sides near the upper end of the member. These holes are for two purposes, first to permit of a ready turning of the ax by inserting a bar so that the ax and piston rod and piston may be turned around to position the ax as may be desired. The second purpose for which these holes are provided is to permit the utilization of the device in connection with a block and tackle, one end of the tackle as will be later described, being connected to a clevis 50 carried by a pin 51 which is inserted into either hole 48 or hole 49.

The upper end of the upright frame carries a beam 51 from which is suspended a sheave block or pulley 52, the rope element 53 of the block and tackle passing around said sheave block with one end attached to clevis 50, and with carrying the other sheave block 54 with which connection is made to the stump as 55.

On the truck 10 is mounted a support consisting of a base plate 56 which is firmly bolted or otherwise secured to the supporting truck. Rising therefrom is a shaft 57 which receives a casting 58, through which extends and has keyed to its upper end a worm wheel 59. The casting 58 has two forwardly-projecting brackets 60 constituting bearings for the shaft 16, and in which the said shaft is normally secured against rotation by set screws 61. Rising from the bearings 60 are short standards 62 which constitute bearings for a shaft 63 having a worm 64 to mesh with the worm wheel 59. On this shaft 63 is a ratchet wheel 65 and sleeved on to the end of the shaft is an operating lever 66 having a spring-pressed pawl 67 to engage the ratchet wheel 65, the pawl being manipulated so as to engage with and disengage it from the ratchet wheel by the finger lever 68 carried by the lever 66.

Loosely fitted on to the shaft 16 inside of the beams 14 are angle braces 69, the upper ends of which are fastened by bolts 70 to the uprights 11, these bolts having a play when loosened in slots 71 in said uprights 11. The bolts are held in position and prevented from dropping out when loosened by guard plates 72 attached to the outer faces of the uprights 11.

Such being the detailed construction of the device embodying our invention, the operation of the same is as follows:—With the piston head 20 at the lower end of the cylinder as shown in Fig. 2, the operator grasps lever 31 at the free end and depresses the same, causing it to rotate on pivot pin 32 and through the connection at 30 with the rod 29, rests said rod and through the couplings 28 connecting the rod to the stems of valves 21 and 22 operates said valves, so as to open inlet port 25 at the lower end of the cylinder to admit motive fluid beneath the piston 26, causing the latter to rest in the cylinder 18. This positioning of the valves brings exhaust port 23 into communication with exhaust pipe 24. As the piston moves upwardly in the cylinder 18 and strikes trip rod 36, it operates rod 29 through the connections 33, 35, so as to reverse the valves, opening inlet port 22 and exhaust port 26. The motive fluid being now above the piston 26, the latter will be driven down, so as to drive the ax member into the stump or other object being operated upon. The blow which will be struck will of course depend entirely on the pressure of the motive fluid employed, and on the size of the apparatus as constructed.

Adjustment of the frame to raise or lower the same as may be desired according to the height of the stumpage through which the machine is to operate is had as follows: The ax member 46 is lowered on to the stump or other object to be operated upon, and sufficient motive fluid is admitted into the upper end of the cylinder to sustain the beams 14 when set screws 61 are loosened, the engine being manipulated so as to utilize the ax and cylinder as a jack to raise or lower beams 14 as they rotate on shaft 16. As soon as the beams 14 have been brought to the desired position, set screws 61 are tightened. This has of course moved the frame embodying uprights 11 and the parts carried thereby out of the vertical position, which is not desirable, since it has been found that the grain of most trees approximates a vertcal position whether the tree be located on level ground or on a hillside. Therefore, to bring the uprights 11 and the parts carried thereby again into the vertical position, the ax member is lowered on to the stump or other object being operated upon, the bolts 70 are loosened so that they will play in the slots 71, member 60 rotating around shaft 16. Now, either by working the piston up and down or by moving the tractor 10 backward or forward as desired, the uprights 11 will be revolved around shaft 15, and as soon as they have been brought into the desired vertical position, they are held by the tightening of the nuts on bolts 70. It will be obvious by this construction that the uprights may be positioned obliquely so as to strike a blow upon a long tap root or the like to split the same, which could not be done by a blow directly from above the same.

By manipulating the lever 66, it will be obvious that the shaft 63, its worm 64 and worm wheel 59 will swing the mechanism in the arc of a circle so as to correctly position the same over the object being operated upon.

In practice, the device described is generally mounted upon a traction engine which will also furnish the motive power for operating the engine of the device described, but obviously, it may be mounted on any suitable vehicle, and the motive fluid for operating the same may be obtained from any desired or convenient source.

We desire to call attention to the fact that by the use of the device, we are able to split stumps or the like so that they may be readily removed, and yet be in such condition that the same may be used for commercial purposes as in the making of wooden blocks for pavements, shingles or the like. We also desire to call attention to the fact that the ax is made with a straight and an inclined side, giving the function of a wedge, yet obviating the sticking action which would take place in case the ax were of a purely wedge form, that is inclined on both its opposite faces.

By the use of the block and tackle, or derrick attachment, we are enabled to utilize the same machine for dragging the stumps out of the way and placing them in convenient piles for burning or for use otherwise as may be desired.

While we have entered into details of the construction as the invention has been practised by us, we desire it to be understood that we do not limit ourselves to the construction shown and described, but claim such variations thereof as may fall within the scope of the invention as claimed.

What we claim is:—

1. In a device of the kind described, a main frame, a supplemental frame adapted to carry a tool and projecting from the main frame, said supplemental frame being pivoted at one end to the main frame, uprights on the supplemental frame, said uprights being pivoted at their lower ends to the supplemental frame, means to adjust the inclination of the uprights to the supplemental frame and a reciprocating tool and means to reciprocate the same carried by the uprights in substantial parallel relation to said uprights.

2. In a device of the kind described, a main frame, a supplemental frame adapted to carry a tool and projecting from the main frame, said supplemental frame being pivoted at one end to the main frame, uprights on the supplemental frame, said uprights being pivoted at their lower ends to the supplemental frame, means to adjust the inclination of the uprights to the supplemental frame comprising bars pivoted at their inner ends to the supplemental frame, pivot pin guides on the uprights, and pivot pins in said guides and extending through said bars and a reciprocating tool and means to reciprocate the same carried by the uprights in substantial parallel relation to said uprights.

In testimony whereof we affix our signatures in presence of two witnesses.

CHARLES C. SULLIVAN.
LOUIS PENINGTON DAVIS.

Witnesses:
A. MILES COE,
ERNEST PERRIN.

Copies of this patent may be obtained for five cents each, by addressing the "Commissioner of Patents, Washington, D. C."